United States Patent [19]

Marshall

[11] 4,186,321

[45] Jan. 29, 1980

[54] CURRENT COLLECTOR WITH COMPLIANT BRUSH CONTAINING LIQUID METAL RESERVOIR

[75] Inventor: Robert A. Marshall, Schenectady, N.Y.

[73] Assignee: General Electric Company, Schenectady, N.Y.

[21] Appl. No.: 878,786

[22] Filed: Feb. 17, 1978

[51] Int. Cl.² .......................................... H02K 31/00
[52] U.S. Cl. ..................................... 310/178; 310/219
[58] Field of Search ............... 310/219, 178, 232, 243, 310/231, 248–251; 417/50; 318/253; 322/48

[56] References Cited

U.S. PATENT DOCUMENTS

| | | | |
|---|---|---|---|
| 3,681,633 | 8/1972 | McNab | 310/178 |
| 3,989,968 | 11/1976 | Hatch | 310/11 |
| 4,024,422 | 5/1977 | Gill | 310/178 |
| 4,027,183 | 5/1977 | Hatch | 310/178 |
| 4,027,184 | 5/1977 | Hurley | 310/178 |

FOREIGN PATENT DOCUMENTS 1332786 10/1973 United Kingdom ..................... 310/178
471633 9/1975 U.S.S.R. ................................. 310/219

Primary Examiner—R. Skudy
Attorney, Agent, or Firm—Nathan D. Herkamp; Joseph T. Cohen; Paul R. Webb, II

[57] ABSTRACT

A current collector for an electrical machine employs a rotor collector ring encircled by a stator collector ring to which a compliant brush of U-shaped cross section and fabricated of an electrically conductive, liquid metal-permeable material is attached. The region enclosed between the stator collector ring and the brush is filled with liquid metal which seeps outward through the brush interstices, forming on the brush a thin liquid metal film which makes sliding contact with the rotor collector ring, enhancing conductivity between the rotor and stator collector rings through the brush filaments.

17 Claims, 3 Drawing Figures

CURRENT COLLECTOR WITH COMPLIANT BRUSH CONTAINING LIQUID METAL RESERVOIR

INTRODUCTION

This invention relates to electrical machines employing liquid metal current collectors, and more particularly to apparatus for maintaining electrical contact between the rotor collector ring and stator collector ring of a liquid metal current collector by allowing a thin film of liquid metal to seep onto the innermost peripheral surface of a compliant brush containing a continually-replenished reservoir of liquid metal.

In an acyclic machine using, instead of solid brushes, liquid metal current collectors in the shape of rings, the liquid metal forms a portion of the current-carrying loop. It is necessary for such current collectors to achieve adequate current collection at a current density in the liquid metal that is reasonable for that material, so as to avoid excessive heating, and it is further desirable to minimize the area of liquid metal that contacts a relatively moving surface, so as to avoid excessive viscous drag, all without requiring extremely tight tolerances in construction.

In B. D. Hatch application Ser. No. 838,714, filed Oct. 3, 1977 and assigned to the instant assignee, liquid metal is continued within a raceway defined by a stator collector ring which includes a plurality of fins protruding radially inward into a plurality of cage sectors, respectively, thereby essentially precluding expulsion of the liquid metal under the influence of Lorentz forces. In B.D. Hatch application Ser. No. 876,570 (Docket RD-10,168), filed Feb. 10, 1978, the radial size of the gap between each pair of rotor and stator collector rings is significantly reduced, so that less liquid metal is employed therein, by attaching a compliant brush of electrically conductive filaments to the stator collector ring and extending the brush to a position closely adjacent the rotor collector ring, so that less liquid metal is expelled from the gap. The dimensional allowances for manufacturing and assembly tolerances, thermal expansion, etc. are compensated by the compliance of the brush, enabling the reduction in spacing between paired rotor and stator collector rings.

The present invention constitutes an improvement over the aforementioned Hatch applications Ser. Nos. 838,714 and 876,570 (Docket RD-10,168) in that the concept of confining liquid metal between the rotor collector ring and each of a plurality of cage sectors is combined with that of attaching a compliant brush of electrically conductive filaments to the stator collector ring and extending the brush to a location closely adjacent, but out of contact with, the rotor collector ring. By fabricating each cage sector of a liquid metal-permeable conductive material, such as braid or honeycomb, the cage can be extended from the stator collector ring radially inward to a location closely adjacent, but out of contact with, the rotor collector ring. Liquid metal, continually supplied to the interior of the cage, thus seeps outward through the cage interstices. On the external, radially-innermost surface of the cage, which acts as a brush, liquid metal that has seeped out of the cage forms a thin conductive film to provide electrical contact between opposed radial surfaces of the rotor and stator collector rings.

Accordingly, one object of the invention is to provide a high efficiency, low loss current collector for a D.C. acyclic machine.

Another object is to provide a current collector which allows continuous electrical contact between a pair of cooperating acyclic machine rotor and stator collector rings through a very thin film of liquid metal on predetermined cages affixed to the stator collector ring.

Another object is to provide a low loss liquid metal current collector configuration which does not require extremely tight manufacturing tolerances.

Briefly, in accordance with a preferred embodiment of the invention, an electrical current collector for an acyclic machine comprises a rotor collector ring, and a stator collector ring concentrically encircling the rotor collector ring. The stator collector ring is attached to a U-shaped brush fabricated of a compliant, liquid metal-permeable conductive material extending radially-inward to a location closely adjacent, but out of physical contact with, the rotor collector ring. Liquid metal situated in the region enclosed between the stator collector ring and the U-shaped brush seeps through interstices within the brush walls to establish contact between the rotor collector ring and the innermost periphery of the brush. Means coupled to the interior of the brush replenishes liquid metal lost by seepage outward through the interstices within the brush walls.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
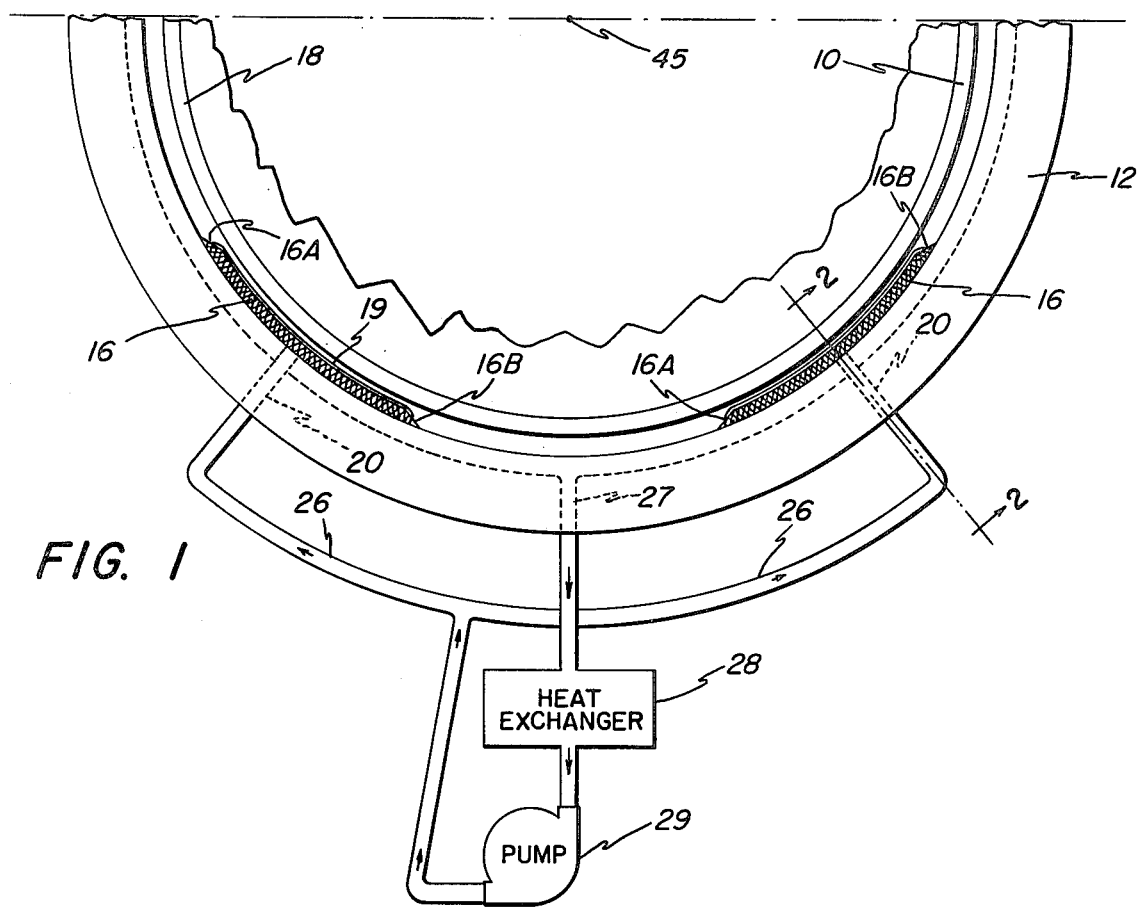
FIG. 1 is an axial end view of a peripheral segment of the current collector assembly constructed in accordance with the invention, showing external liquid metal connections thereto.

In FIG. 1, a rotor collector ring 10 of an acyclic machine, such as a motor, is illustrated as being encircled about its circumference by a stator collector ring 12. The motor rotates about an axis of rotation 45, with the rotor and stator collector rings being concentric thereabout. As evident in FIG. 2, the external surface of rotor collector ring 10, except for a circumferential portion 18 of the radially-outermost surface thereof (which may preferably encompass the entire radially-outermost surface of collector ring 10), is completely coated with insulation 17. This insulation typically comprises a ceramic coating, such as sprayed alumina, which is subsequently vacuum-impregnated with an epoxy insulation.

Figure 2:
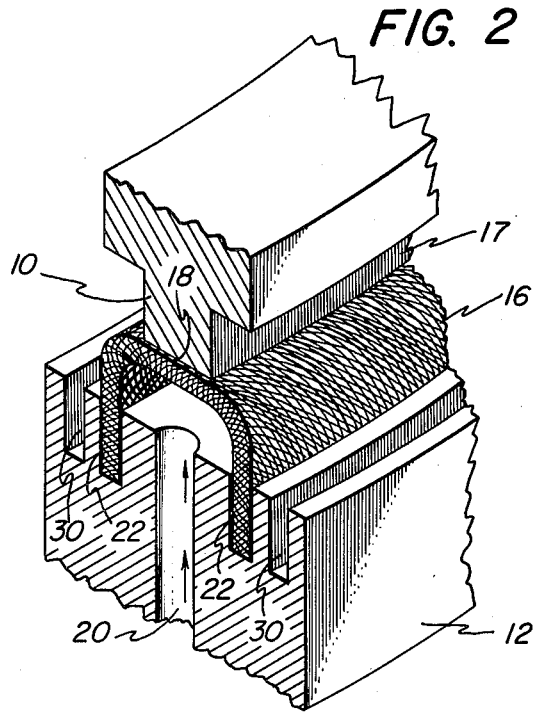
FIG. 2 is a perspective view of the current collector apparatus shown in FIG. 1, as viewed along line 2-2 in FIG. 1.

At the radially-inner portion of stator collector ring 12 a plurality of porous cages 16, each formed of a mesh of conductive filaments, are affixed within a pair of channels 22 in the stator collector ring, to form a U- shaped, as visible in FIG. 2. The mesh of each cage also forms the closed ends 16A and 16B of each cage, as indicated in FIG. 1, each closed end 16A and 16B being affixed, respectively, within a separate channel (not shown), extending generally axially beteen each of channels 22. This results in a compliant brush which initially is situated in rubbing contact with rotor collector ring tip 18, exerting light contact pressure at rotor tip 18. The brush is of plaited construction and may comprise flat copper braid, available from New England Electric Wire Corporation, Lisbon, N.H. The braid is preferably flattened and folded over to a double thickness before being formed into its circular, U-shaped configuration, with the free ends of the braid being imbedded in grooves 22 and the generally-axial grooves interconnecting therewith. The braid typically is electron beam welded to stator collector ring 12 within grooves 22 and the generally-axial grooves interconnecting therewith. If preferred, stator collector ring 12 may first be crimped axially so as to support braid 16 firmly within circumferential grooves 22 during the welding procedure. Since the filamentary material of brush 16 must be fully compatible with the liquid metal, such as sodium-potassium for example, to be employed therewith, it must exhibit long performance life in the liquid metal so as to provide very low electrical resistance at the collector site. Materials other than copper which therefore may be employed in the braid are metallurgically-bonded copper-coated steel wire (e.g. 60% steel, 40% copper) and chromium copper alloy. For copper braid, size 48-8-36 has been found well suited for utilization in the invention. Also, various surface finishes, such as electroplated gold, silver, tin, nickel, etc. may be applied to both the solid and compliant copper or copper alloy surfaces of the collector to enhance wettability of these surfaces and reduce electrical resistance at the collector site.

The material of brush 16 desirably is elastically compliant with the dynamic (i.e., operationally induced) movements of rotor tip 18 about its mean, or average, position. These motions are of small magnitude, typically measured in thousandths of an inch, in machines that are finish ground to tolerances of ± 0.001 inches after final assembly of the rotor and collector ring constituent parts on the rotor and stator halves, respectively, of the machine. Circulation of the liquid metal as a coolant between the rotor and stator surfaces provides convective cooling of both rotor and stator parts, maintaining them at small differences in temperature with respect to each other as well as at small temperature differentials from start-up to full speed and full torque conditions. Thus the required elastic compliance of brush 16 is no more than a relatively small amount. The plastic formability of each brush 16 employed in the machine must also be sufficient to allow for manufacturing tolerances and be suited to final accurate setting into its desired position at each current collector at the time of final assembly as well as during earlier fabrication operations.

Stator collector ring 12 contains a plurality of radially-oriented passages 20 therein, each of which opens into the region enclosed between each of cages 16, respectively, and stator collector ring 12. Each of passageways 20 is connected to tubing 26, as shown in FIG. 1, permitting flow of liquid metal from a liquid metal pump 29, through passageways 26, into the region enclosed between stator collector ring 12 and each of cages 16. Excess liquid metal leaving the walls or outer surfaces of cages 16 drains into channels 30 on either axial side of the cages and from there flows to a sump 27 at each axial side of stator collector ring 12. From sump 27, the liquid metal is returned to a heat exchanger, wherein it is cooled. By cooling the liquid metal received from sump 27 and then recirculating it back to cages 16, the collector apparatus is kept from overheating.

The nonsolid gap between rotor 10 and stator 12 is limited to but a very thin film 19 of liquid metal (e.g., 0.002 inches thickness) extant between rotor tip 18 and each of brushes 16. As rotation begins, the liquid metal is drawn around the periphery of each of brushes 16 by both frictional and magnetohydrodynamic forces so as to provide continuous electrical connection to stator 12 from the entire portions of the circumference of rotor tip 18 that are in instantaneous electrical contact with brushes 16. The thin gap between rotor tip 18 and each of brushes 16 is easily filled with liquid metal and maintained full since its small thickness frictionally retards escape of the liquid metal under the influence of Lorentz axial explusion forces.

Dimensional allowances for manufacturing, assembly, thermal expansion, etc. are provided by using fine, high conductivity filaments (e.g., wires of approximately 0.005 inches diameter) in compliant brush 16. These brush filaments then conduct the electrical current between stator ring 12 and the thin liquid metal-filled gap at rotor tip 18. The relatively high conductivity of the brush filaments with respect to that of the liquid metal results in relatively low electrical loss in each of brushes 16, the resistance of each brush being but several microhms.

If rotor collector ring 10 is initially in contact with brushes 16, then as rotation of rotor collector ring 10 progresses, the material of brushes 16 becomes worn away by the relatively harder rotor collector ring material (e.g., the ceramic insulation surface, typically sprayed alumina, at the axial boundaries of rotor tip 18). This wear of brushes 16 eventually removes the elastic compliance contact pressure on rotor collector ring tip 18, so that even the very slight eccentricity of the rotor tip results in a very thin gap between the rotor tip and each of brushes 16 at their regions of mutual electrical (though not direct physical) contact. The rotor tip is preferably machined to be concentric within 0.001 inches Total Indicator Reading (i.e. with radial accuracy of ±0.0005 inches).

When the acyclic machine is operated at high speed, the liquid metal spreads itself over each complete portion of the periphery of rotor 10 facing the surface of a brush 16. Lorentz expulsion forces acting on the liquid metal in each of the thin gaps between braid 16 and rotor tip 18 force a flow of liquid metal from one axial side of rotor 10 and stator 12, through the gap between braid 16 and rotor tip 18, to the other axial side of rotor 10 and stator 12, where it then runs off into collection channels 30, ultimately to be recirculated back to the collector gaps through heat exchanger 28 and pump 29. The Lorentz expulsion forces result from interaction of direct current flowing between the rotor and stator collector rings and the circumferential magnetic field produced by this same current in all of the current collectors in the machine. These Lorentz expulsion forces have essentially no effect on liquid metal situated between stator collector ring 12 and each of cages 16 since most of the current passing radially through each thin gap between braid 16 and rotor collector ring 10 is conducted to stator collector ring 12 through the braid rather than through the liquid metal contained between the braid and the stator collector ring, due to the relatively low resistivity of the braid with respect to that of the liquid metal. Hence the contained liquid metal experiences only very weak Lorentz forces, and is thus not forced axially outward through the braid to any significant extent. Still better containment of liquid metal within brushes 16 may be achieved by inserting a sheet of solid material between the layers of braid in the side walls of each brush, the solid material being nonpermeable to liquid metal.

Presence of an axial magnetic field, as produced by an axial coil (not shown) in the acyclic machine, together with radial current flow through liquid metal in the thin gaps between rotor collector ring 10 and each of brushes 16 results in torqueing forces acting on the liquid metal. These torqueing forces rotate the liquid metal about the entire circumference of the rotor collector ring. By thus spreading the liquid metal through a 360° arc about the rotor collector ring tip, cooling of the acyclic machine by the liquid metal is greatly enhanced.

Figure 3:
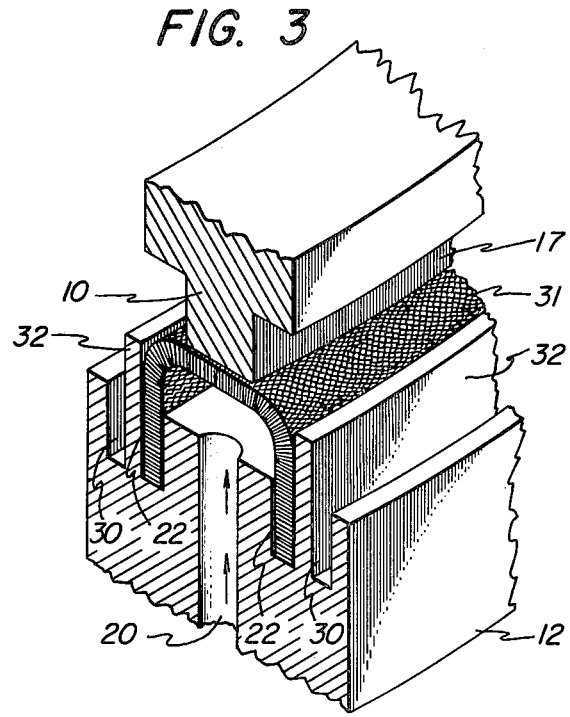
FIG. 3 is a perspective view of another embodiment of compliant brush and stator collector ring for use in a current collector assembly constructed in accordance with the invention.

In FIG. 3, an alternative embodiment of U-shaped brush for use in the invention is illustrated, wherein like numerals indicate like components. Instead of a mesh of filaments, however, brush 31 is shown as comprising a conductive honeycomb material, such as copper, held in grooves 22 and having openings of sufficiently small area to allow only slow seepage of liquid metal outward therethrough. In the illustrated embodiment, the sides of the honeycomb brush further include a solid material, such as a wall 32 extending radially inward from stator collector ring 12 to a location radially outward from the radially innermost surface of brush 31. Wall 32, being nonpermeable to liquid metal, serves to inhibit escape of liquid metal in an axial direction outward from the interior of the brush.

The apparatus described herein has been considered as having a plurality of brushes attached to the collector ring. Those skilled in the art will recognize that, in the alternative, a single brush may be employed, either extending in continuous fashion around the entire stator collector ring, or around less than the entire stator collector ring.

The foregoing describes a high efficiency, low loss current collector for a D.C. acyclic machine. The current collector allows continuous electrical contact between a pair of cooperating acyclic machine rotor and stator connector rings through a very thin film of liquid metal on predetermined cages affixed to the stator collector ring. The liquid metal current collector configuration thus exhibits low losses and does not require extremely tight manufacturing tolerances. Moreover, the liquid metal current collector of the instant invention is usable in conventional, as well as acyclic, machines.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. An electrical current collector for an electrical machine comprising:
   a rotor collector ring;
   a stator collector ring encircling said rotor collector ring;
   at least one U-shaped compliant brush attached to said stator collector ring, said brush being fabricated of electrically conductive, liquid metal-permeable material extending radially-inward to a location closely adjacent, but out of physical contact with, said rotor collector ring;
   liquid metal filling the region enclosed between said stator collector ring and said brush, said liquid metal seeping outward from said region through interstices within the walls of said brush so as to establish electrical contact between said rotor collector ring and said brush at the innermost periphery of said brush; and
   pumping means coupled to the interior of said brush to replenish liquid metal lost from said interior of said brush by seepage outward through the walls of said brush.

2. The apparatus of claim 1 wherein said liquid metal-permeable material comprises a mesh of conductive filaments.

3. The apparatus of claim 2 wherein the filaments of said compliant brush are plaited into braid.

4. The apparatus of claim 3 wherein said braid is affixed to said stator collector ring inside a pair of parallel, circumferential grooves therein.

5. The apparatus of claim 4 wherein said brush includes solid side walls nonpermeable to liquid metal.

6. The apparatus of claim 1 wherein said liquid metal-permeable material comprises a conductive honeycomb structure.

7. The apparatus of claim 6 wherein said honeycomb structure is affixed to said stator collector ring inside a pair of parallel, circumferential grooves therein.

8. The apparatus of claim 7 wherein said brush includes solid side walls nonpermeable to liquid metal.

9. The apparatus of claim 1 wherein said stator collector ring includes a pair of circumferential slots therein, said slots being on opposite axial sides of said compliant brush and in liquid metal communication with said pumping means so as to recirculate liquid metal drained off the exterior surfaces of said brush back to the interior of said brush.

10. The apparatus of claim 9 wherein said liquid metal-permeable material comprises a mesh of conductive filaments.

11. The apparatus of claim 10 wherein the filaments of said compliant brush are plaited into braid.

12. The apparatus of claim 11 wherein said braid is affixed to said stator collector ring inside a second pair of circumferential slots therein, said second pair of slots being axially inward of each slot of the first pair.

13. The apparatus of claim 12 wherein said brush includes solid side walls nonpermeable to liquid metal.

14. The apparatus of claim 9 wherein said liqid metal-permable material comprises a conductive honeycomb structure.

15. The apparatus of claim 14 wherein said honeycomb structure is affixed to said stator collector ring inside a second pair of circumferential slots therein, said second pair of slots being axially inward of each slot of the first pair.

16. The apparatus of claim 15 wherein said brush includes solid side walls nonpermeable to liquid metal.

17. The apparatus of claim 10 including heat exchanger means in liquid metal communication with said pumping means, said heat exchanger means cooling liquid metal passing therethrough prior to being returned to the interior of said brush.

* * * * *